United States Patent
Hieda et al.

[11] Patent Number: 5,767,899
[45] Date of Patent: Jun. 16, 1998

[54] IMAGE PICKUP DEVICE

[75] Inventors: Teruo Hieda, Yokohama; Makoto Shimokoriyama, Kawasaki, both of Japan

[73] Assignee: Canon Kabushiki Kaisha, Tokyo, Japan

[21] Appl. No.: 660,335

[22] Filed: Jun. 4, 1996

Related U.S. Application Data

[62] Division of Ser. No. 171,178, Dec. 22, 1993, Pat. No. 5,548,330.

[30] Foreign Application Priority Data

Dec. 24, 1992 [JP] Japan .................................. 4-344555
Dec. 25, 1992 [JP] Japan .................................. 4-358971

[51] Int. Cl.[6] .............................. H04N 5/208; H04N 9/68
[52] U.S. Cl. ........................ 348/222; 348/256; 348/235
[58] Field of Search ............................ 348/222, 252, 348/253, 255, 256, 678, 679, 234, 235; H04N 5/20, 5/208, 5/52, 9/68

[56] References Cited

U.S. PATENT DOCUMENTS

| | | | |
|---|---|---|---|
| 5,267,028 | 11/1993 | Suga et al. | 348/237 |
| 5,496,106 | 3/1996 | Anderson | 348/255 |
| 5,548,330 | 8/1996 | Hieda et al. | 348/234 |
| 5,568,193 | 10/1996 | Kawahara | 348/222 |

*Primary Examiner*—John K. Peng
*Assistant Examiner*—Jeffrey S. Murrell
*Attorney, Agent, or Firm*—Fitzpatrick, Cella, Harper & Scinto

[57] ABSTRACT

In an image pickup device for generating a corrected luminance signal by subtracting two color difference signals as correction signals from a luminance signal, a correction signal is generated by base-clipping at least one of the two color difference signals.

6 Claims, 23 Drawing Sheets

| Mg | G  | Mg | G  | Mg |
|----|----|----|----|----|
| Ye | Cy | Ye | Cy | Ye |
| G  | Mg | G  | Mg | G  |
| Ye | Cy | Ye | Cy | Ye |
| Mg | G  | Mg | G  | Mg |
| Ye | Cy | Ye | Cy | Ye |

IMAGE PICKUP DEVICE

This application is a division of application Ser. No. 08/171,178 filed Dec. 22, 1993, now U.S. Pat. No. 5,548,330 issued Aug. 20, 1996.

BACKGROUND OF THE INVENTION

1. Field of the Invention

The present invention relates to an image pickup device suitable for a single-plate image pickup device for use in, e.g., a recorder integrated with a camera or a color video camera.

2. Related Background Art

As is well known, a conventional single-plate CCD camera is constituted as shown in FIG. 13. The operation of this single-plate CCD camera will be described below with reference to FIG. 13.

Light from an object to be imaged, which is incident through an optical system 201 such as a lens, is converted into an electrical signal by a solid-state sensor 202 such as a CCD. The electrical signal is then sampled and converted into digital data by an A/D converter 203. The CCD 202 is a complementary color type single-plate CCD shown in FIG. 14A, in which color difference components and a luminance component are frequency-multiplexed as shown in FIG. 14B.

In the single-plate CCD camera with the above arrangement, color difference signals are extracted by a procedure to be described below. That is, a color separation circuit 204 extracts color modulation components CR and CB and a luminance component Y shown in FIG. 14B from the digital CCD output. A matrix circuit 205 converts these components into signals of three primary colors R, G, and B.

These R, G, and B signals are applied to multipliers 206a, 206b, and 206c and multiplied by the values of coefficients 208a, 208b, and 208c of registers, respectively, thereby performing adjustment of white balance. The resulting signals are then subjected to γ correction performed by gamma circuits 207a to 207c and converted into a Y signal by a matrix circuit 209 which is represented by the following equation:

$$Y=0.59R+0.3G+0.11B \qquad (1)$$

Subsequently, subtracters 210 and 211 are used to calculate the difference between the R and Y signals and the difference between the B and Y signals, respectively, thereby obtaining signals R-Y and B-Y as color difference signals.

Thereafter, the R-Y and B-Y signals are subjected to color correction performed by a linear matrix circuit 212 for performing color correction, and quadrature-modulated into digital chroma signals by a modulator 215 after being passed through faders 213 and 214, respectively, which are controlled by a controller (not shown). These digital signals are converted into analog signals by a D/A converter 216 and output from an output terminal 217 as an analog chroma signal C.

On the other hand, the luminance signal Y is, in order to keep its band (resolution), passed through a low-pass filter (LPF) 218 for suppressing modulation components of color differences, thereby correcting characteristics which are damped by the lens optical system 201 or the like. The resulting signal is then passed through an aperture correction unit 219 to give sharpness to an image.

Thereafter, the signal is subjected to gamma correction by passing through a gamma correction unit 220 and converted into an analog signal through a fader 222 and a D/A converter 223 like in the color difference processing. The consequent analog signal is output from an output terminal 224.

When a color bar chart is photographed, the luminance signal Y which is obtained as described above is different from an output obtained by a three-plate camera. FIG. 15A shows an output from a three-plate camera, and FIG. 15B shows the luminance signal Y of the single-plate camera described above. This phenomenon will be described below.

As shown in FIG. 17, a luminance output $Y_3$ of a three-plate camera is obtained by performing gamma correction for R, G, and B signals, multiplying the resulting R, G, and B signals by coefficients of 0.59, 0.3, and 0.11, respectively, and adding these signals.

A luminance output $Y_1$ of a single-plate camera is, on the other hand, obtained by passing a CCD output through a low-pass filter and performing gamma correction for the resulting output. R, G, and B components of this CCD output are, for example, R:G:B=2:3:2, and these components are subjected to gamma correction. Therefore, the output as shown in FIG. 15B is obtained. This signal has larger errors than those of the luminance output $Y_3$ of the three-plate camera and hence has a drawback of a poor color reproducibility in objects to be photographed in dark colors.

SUMMARY OF THE INVENTION

The present invention has been made in consideration of the above situation, and has as its object to provide an image pickup device capable of preventing reduction in S/N ratio by decreasing errors in luminance, thereby performing accurate correction.

According to one embodiment of the present invention, there is provided an image pickup device for generating a corrected luminance signal by subtracting two color difference signals as correction signals from a luminance signal, wherein a correction signal is generated by base-clipping at least one of the two color difference signals.

According to another embodiment of the present invention, there is provided a circuit for generating a suppression control signal for suppressing two color difference signals by using luminance information, wherein it is possible to freely set a suppression start point and a suppression gain of the suppression control signal.

According to still another embodiment of the present invention, there is provided an image pickup device having a unit for converting a signal from an image sensor or an image pickup tube into a digital signal, comprising extracting means for extracting a high-frequency component, means for limiting an output level of the high-frequency component in accordance with a signal level of the digital signal, and adding means for adding the high-frequency component to the original digital signal.

According to each of the above embodiments, R-Y and B-Y color difference signals are base-clipped, passed through coefficient units, and subtracted as correction signals from a luminance signal. This processing corrects luminance errors of a single-plate camera to approach them to those of a three-plate camera. The processing also can prevent reduction in S/N ratio of the luminance caused by correction in a light-color portion, thereby making accurate correction possible.

In addition, since the amplitude amount of noise is subtracted from color difference signals and the results are processed by limiters, a correction hue can also be controlled simultaneously with base clip. For example, it is possible to correct hues only on R, Mg, and B sides by selecting a limiter of a negative side.

According to still another embodiment of the present invention, it is possible to set several different suppression start points and suppression gains of a suppression control signal for suppressing color difference signals by using luminance information. Therefore, occurrence of false colors in a high-luminance portion can be prevented in correspondence with CCDs of various characteristics.

Furthermore, more optimum suppression conditions can be set by a controller in accordance with photographing conditions. It is also possible to completely suppress false signals of colors that are readily blurred in a high-luminance portion by widening a time width of the suppression control signal.

According to still another embodiment of the present invention, the base clip width of an edge correction signal is varied according to the level of a luminance signal. This can reduce noise in a portion where an S/N ratio is low such as a dark portion of an image, making reproduction of high-quality images possible.

Other objects and advantages of the invention will become apparent from the following detailed description taken in conjunction with the accompanying drawings.

DETAILED DESCRIPTION OF THE PREFERRED EMBODIMENTS

One embodiment of an image pickup device according to the present invention will be described below with reference to the accompanying drawings.

Figure 1:
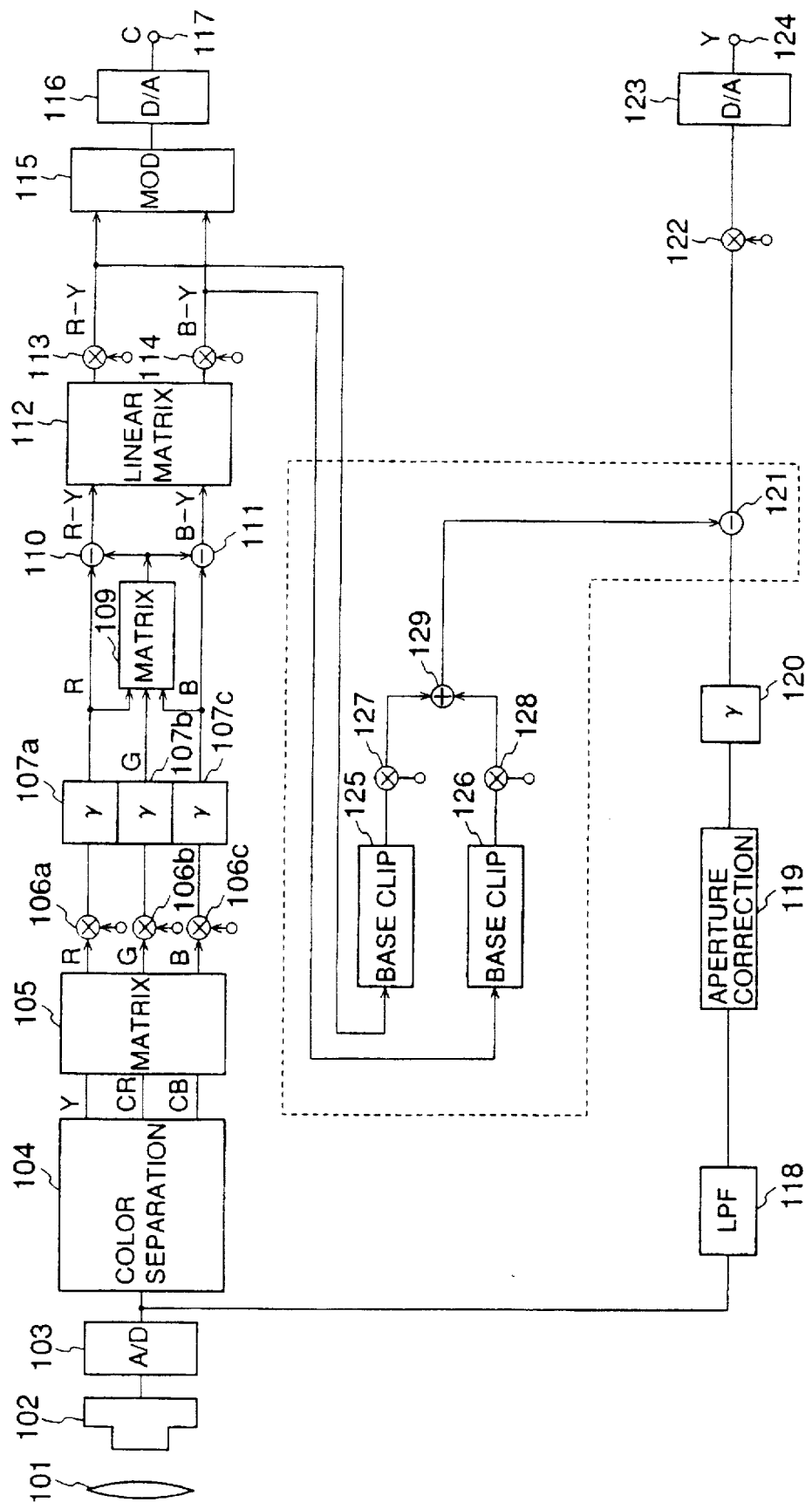
FIG. 1 is a block diagram showing the arrangement of an image pickup device according to the first embodiment of the present invention.

FIG. 1 is a block diagram showing the arrangement of an image pickup device according to the first embodiment of the present invention. Referring to FIG. 1, this image pickup device includes a lens system 101, a complimentary color area sensor 102 such as a CCD, an A/D converter 103, a color separation circuit 104, a matrix circuit 105, white balance multipliers 106-a, 106-b, and 106-c, and gamma correction circuits 107-a, 107-b, and 107-c.

The image pickup device also includes a matrix circuit 109 for a luminance signal, subtracters 110 and 111, a linear matrix circuit 112 for correcting hues, fader multipliers 113 and 114, a modulator 115, a D/A converter 116, a chroma signal output terminal 117, a low-pass filter 118 for suppressing a color modulation component, and an aperture correction circuit 119.

Other components of this image pickup device are a gamma correction circuit 120, a fader multiplier 122, a D/A converter 123, a Y signal output terminal 124, base clip circuits 125 and 126, multipliers 127 and 128 for adjusting a correction amount, an adder 129, and a subtracter 121.

A circuit surrounded by dotted lines which is the characteristic feature of the image pickup device of this embodiment will be described below. Two color difference signals R-Y and B-Y formed by a color signal processing system are extracted from immediately before the modulator 115 and applied to the base clip circuits 125 and 126, respectively. At this point, each of the R-Y and B-Y color difference signals is an 8-bit signal.

Figure 2A:
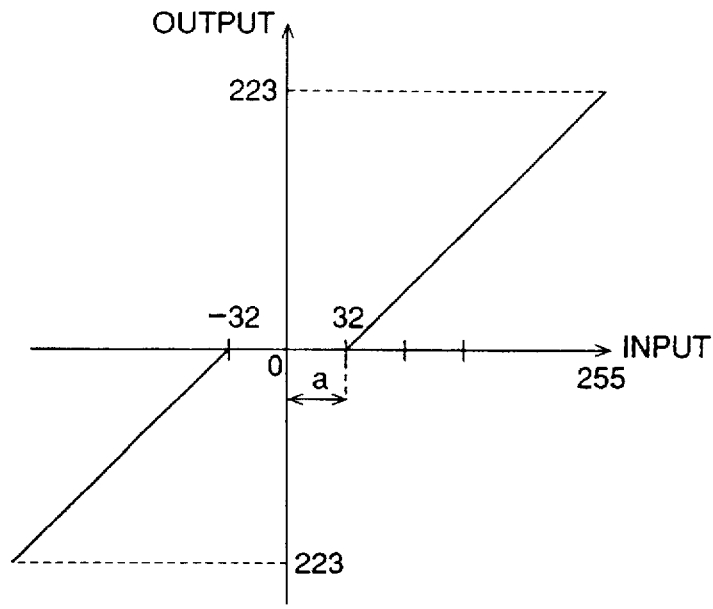
FIGS. 2A and 2B are graphs showing the base clip of a correction signal and the characteristics of a limiter, respectively.

As shown in FIG. 2A, the base clip circuits 125 and 126 do not output any signal for low levels of the R-Y and B-Y color difference signals but output signals which are linear with respect to input R-Y and B-Y signals when the input signals have a certain level a or higher.

Assume, for example, that a value of 32 is set as the level a. The outputs from the base clip circuits 125 and 126 are supplied to the multipliers 127 and 128 in which the all levels of the signals are adjusted.

The R-Y and B-Y signals from the multipliers 127 and 128 are applied to the adders 129 and added to each other.

The resulting addition output is applied to the subtracter 121 and subtracted from a luminance signal, thereby correcting a Y signal.

Figure 15A:
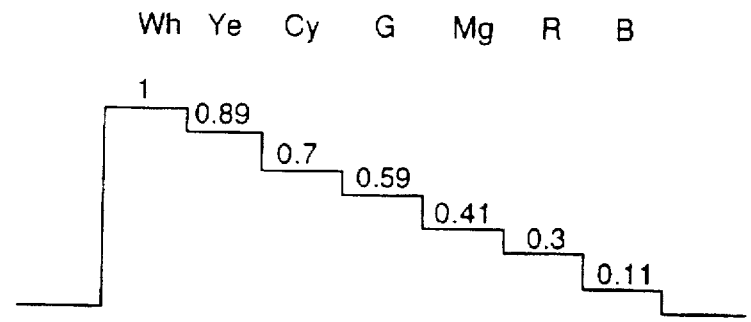
FIGS. 15A to 15C are views for explaining correction of a luminance signal when a color bar chart is photographed.
Figure 15B:
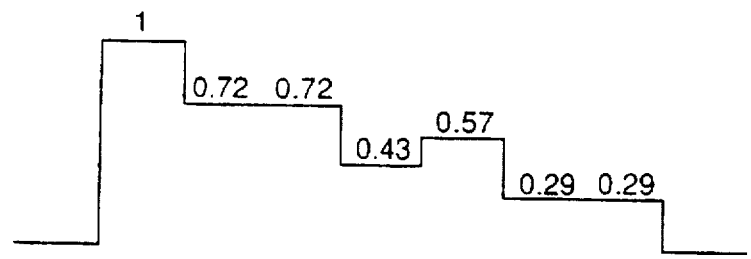
Figure 15C:
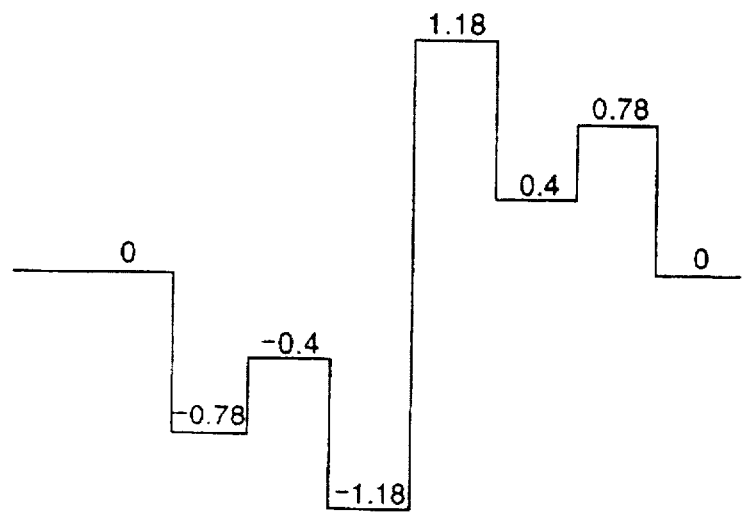

Note that, when a color bar chart is photographed, a Y signal which is applied to the subtracter 121 is a signal illustrated in FIG. 15B, and an output from the adder 129 after the color difference signals are multiplied by a coefficient has a value proportional to that of a signal illustrated in FIG. 15C.

Figure 16A:
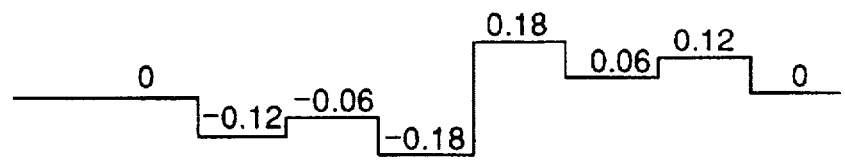
FIGS. 16A and 16B are views for explaining correction of a luminance signal when a color bar chart is photographed.
Figure 16B:
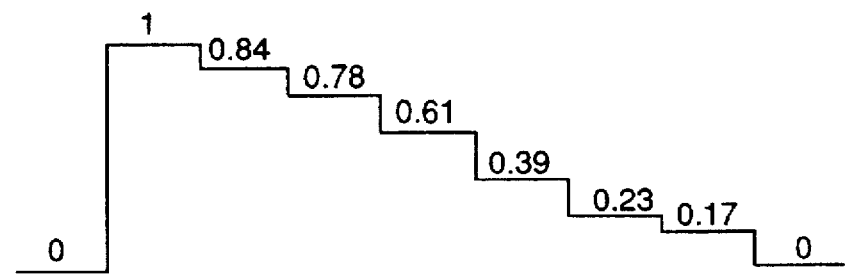
Figure 17:
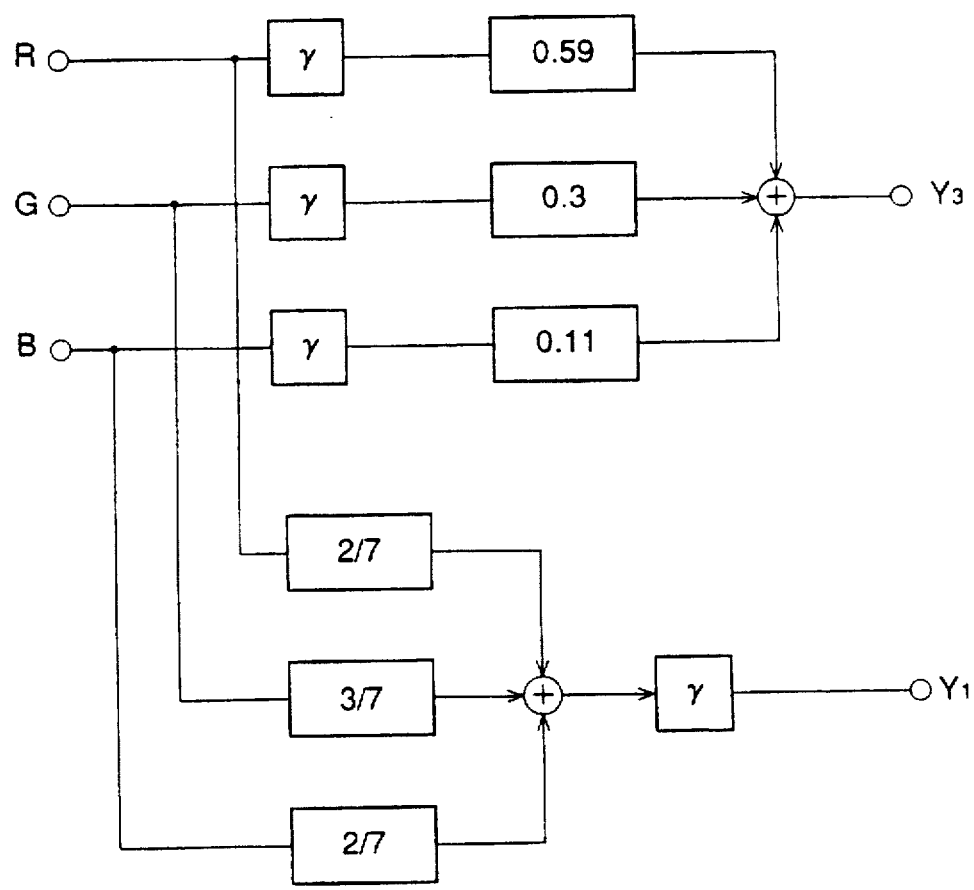
FIG. 17 is a view showing the difference in processing between a three-plate camera and a single-plate camera.

As an example, if the signal shown in FIG. 15C is multiplied by 0.15 as the coefficient of the multipliers 127 and 128, a signal shown in FIG. 16A is obtained as the output from the adder 129. In addition, if the signal illustrated in FIG. 15B is applied as the Y input to the subtracter and the signal illustrated in FIG. 16A is used as a correction signal, the resultant output becomes a signal as shown in FIG. 16B, which is very close to the signal obtained by a three-tube camera shown in FIG. 15A.

Figure 3:
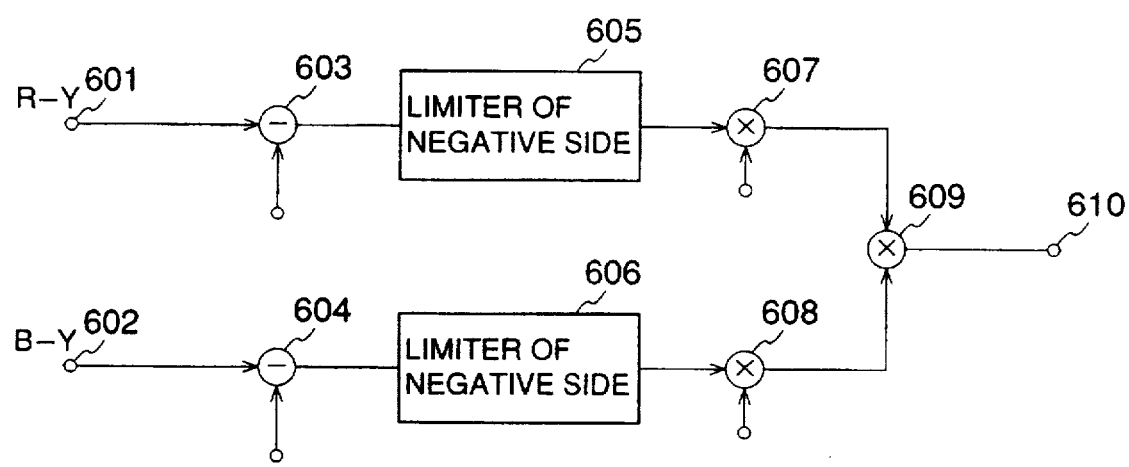
FIG. 3 is a block diagram showing the arrangement of an image pickup device according to the second embodiment of the present invention.

The second embodiment of the present invention will be described below. FIG. 3 is a block diagram showing the second embodiment of the image pickup device according to the present invention.

Referring to FIG. 3, this image pickup device includes an input terminal 601 for a color difference signal R-Y, an input terminal 602 for a color difference signal B-Y, subtracters 603 and 604, and a limiter 605 of a negative side, which outputs 0 only when a negative value is applied and outputs input values in other cases. The image pickup device also includes multipliers 607 and 608, an adder 609, and an output terminal 610 for a correction value.

In this second embodiment, like in the first embodiment described above, color difference signals R-Y and B-Y are extracted from immediately before the modulator 115 shown in FIG. 1 and applied to the input terminals 601 and 602. A predetermined value is extracted from the signals R-Y and B-Y by the subtracters 603 and 604, respectively.

In this embodiment, for example, a value of 32 is subtracted from an 8-bit input. The signals subjected to this subtraction are passed through the limiters 605 and 606 of the negative side. The resultant signals are then applied to the multipliers 607 and 608 and multiplied by a predetermined coefficient.

Subsequently, these two signals are added by the adder 609 to yield a correction signal, i.e., a signal to be subtracted from a Y signal.

Figure 2B:
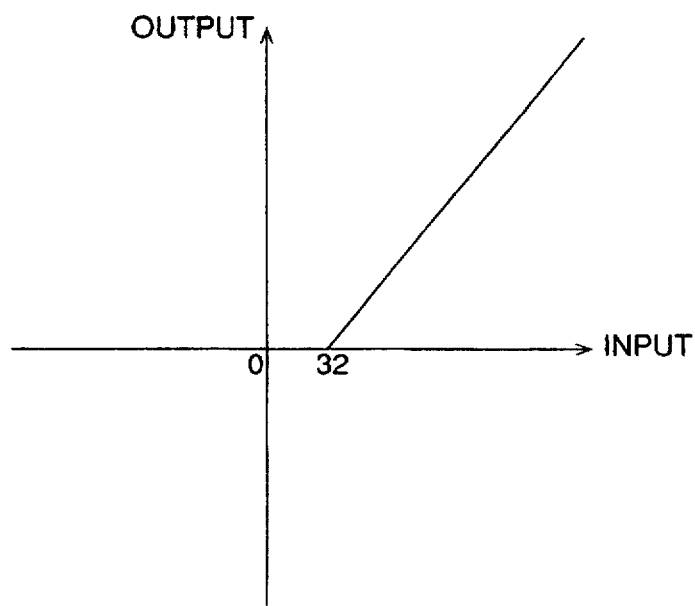

FIG. 2B shows the characteristics of the signal passed through the subtracter 603 and the limiter of the negative side. In this case, since the correction value of the negative side is 0, no correction is performed for hues on Ye, Cy, and G sides in a vector scope, and so it is possible to control only hues on R, Mg, and B sides.

Incidentally, when an object to be photographed with a high luminance is photographed by an image pickup device, symmetry of the amplitude of a color carrier is lost, and this undesirably results in coloring in a portion which is to be originally expressed as a white portion. An embodiment for solving this problem will be described in detail below.

Figure 4:
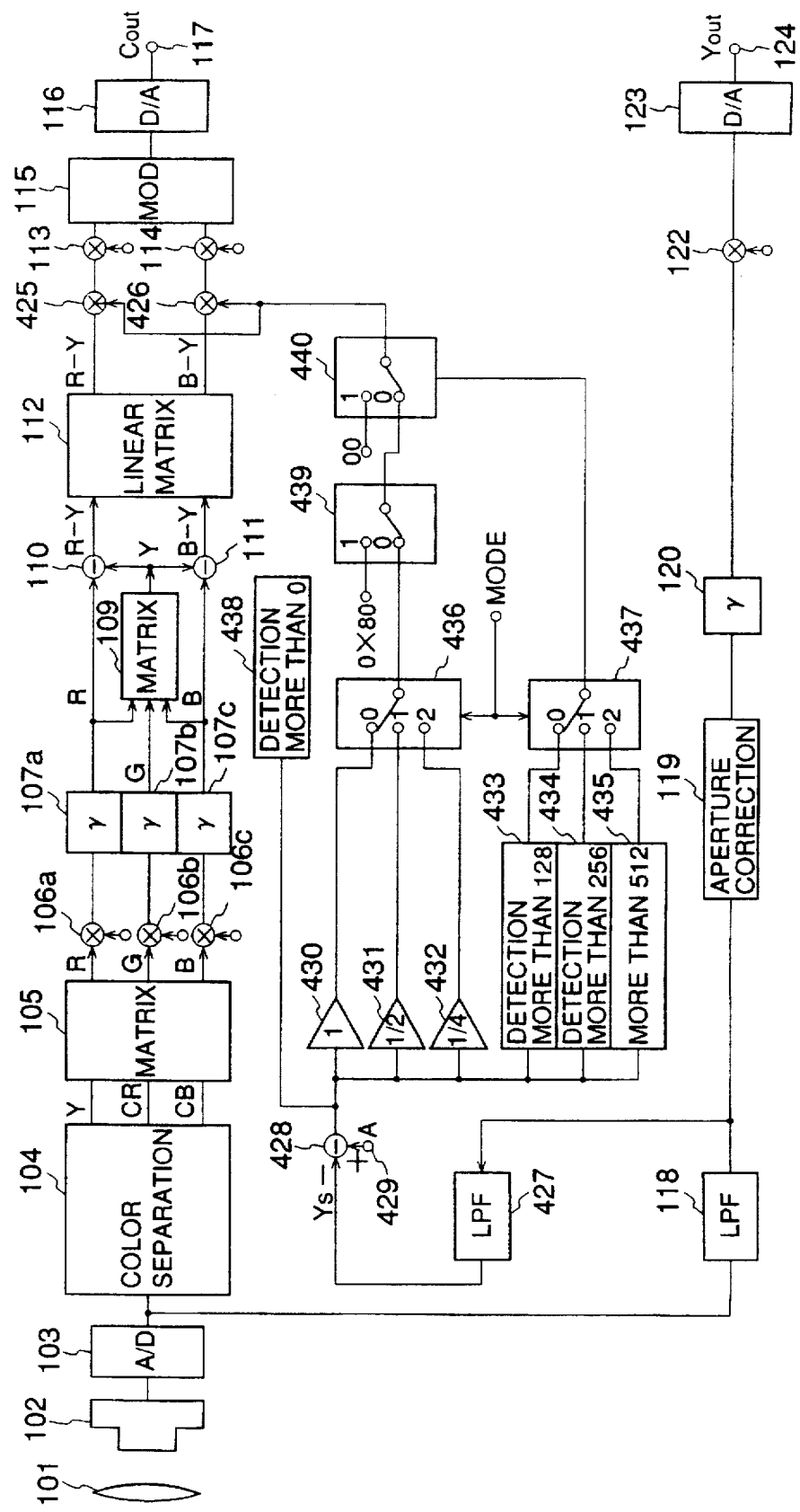
FIG. 4 is a block diagram showing the arrangement of an image pickup device according to the third embodiment of the present invention.

FIG. 4 is a block diagram showing the third embodiment of the present invention. Referring to FIG. 4, the same reference numerals as in FIG. 1 denote the same parts and a detailed description thereof will be omitted.

In FIG. 4, this image pickup device includes a multiplier 425 for suppressing R-Y, a multiplier 426 for suppressing B-Y, a low-pass filter 427, a subtracter 428, and a terminal 429 for giving a set value A for subtraction.

The image pickup device also includes coefficient units 430, 431, and 432 having coefficients of 1, ½, and ¼, respectively, detectors 433, 434, and 435 for generating flag 1 upon receiving more than 128, 256, and 512, respectively, selectors 436 and 437, a detector 438 for more than 0, and selectors 439 and 440.

The operation of the characteristic portion of this embodiment will be described. The band of a luminance signal extracted from immediately after a low-pass filter 118 is limited to half or less that of a luminance signal by the low-pass filter 427. This signal will be referred to as a Ys signal hereinafter. The Ys signal is applied to the subtracter 428, and the subtracter 428 calculates the difference between a certain value A and the Ys signal.

This value A is set at, for example, 100% level of luminance, 416 (10 bits). This difference signal is the basis of a suppression signal for a color difference signal. The difference signal approaches 0 as the Ys signal becomes greater than the value A.

The A-Ys difference signal is applied to the detector 438 for more than 0, the coefficient units 430, 431, and 432 having coefficients of 1, ½, and ¼, respectively, and the detectors 433, 434, and 435 for detecting more than 128, 256, and 512, respectively.

Outputs from these coefficient units 430, 431, and 432 are applied to the selector 436, and outputs from the detectors 433, 434, and 435 are applied to the selector 437. The movable terminals of the selectors 436 and 437 are switched to a coefficient unit and a detector to be selected, respectively, in accordance with respective MODE signals. When the coefficient unit 430 is selected by the selector 436, the detector 433 is selected by the selector 437.

Likewise, the coefficient unit 431 and the detector 434, and the coefficient unit 432 and the detector 435 are selected in combination with each other. Suppose that the coefficient unit 430 and the detector 433 are currently selected. An output from the selector 436 is applied to the selector 439 which is controlled by an output from the more than 0 detector 438. When the A-Ys signal is greater than 0, the more than 0 detector 438 generates flag 1.

That is, if the Ys signal is smaller than A, the selector 439 selects 0×80 as a fixed value. Note that this 0×80 represents gain 1 in the multipliers 425 and 426 for color suppression.

If, on the other hand, the A-Ys signal is 0 or smaller, i.e., if the Ys signal is 416 or less, the selector 439 selects an output from the coefficient unit 430. As the Ys signal increases, the gain of the multipliers 425 and 426 is decreased.

An output from the selector 439 is supplied to the selector 440 which is controlled by an output from the selector 437. Note that the selector 437 selects the detector 433 at this point.

The output from the coefficient unit 430 decreases after the Ys signal has exceeded the value A, i.e., 416. When the coefficient is 1, however, the selector 440 selects 0×00 and generates this value as a fixed value if Ys signal=416+128, i.e., 544.

In summary, the relationship between the R-Y and B-Y color difference signals and the level of the Y signal is such that, when the certain value A is 416 and the coefficient is 1, the gain of the multipliers 425 and 426 is 1 for the level of the Y signal up to 416, and decreases linearly for higher levels of the Y signal. The color difference signals are suppressed gradually, and, for the level of 544 or higher, the gain is fixed to 0, resulting in characteristics in which colors are completely suppressed.

Figure 5:
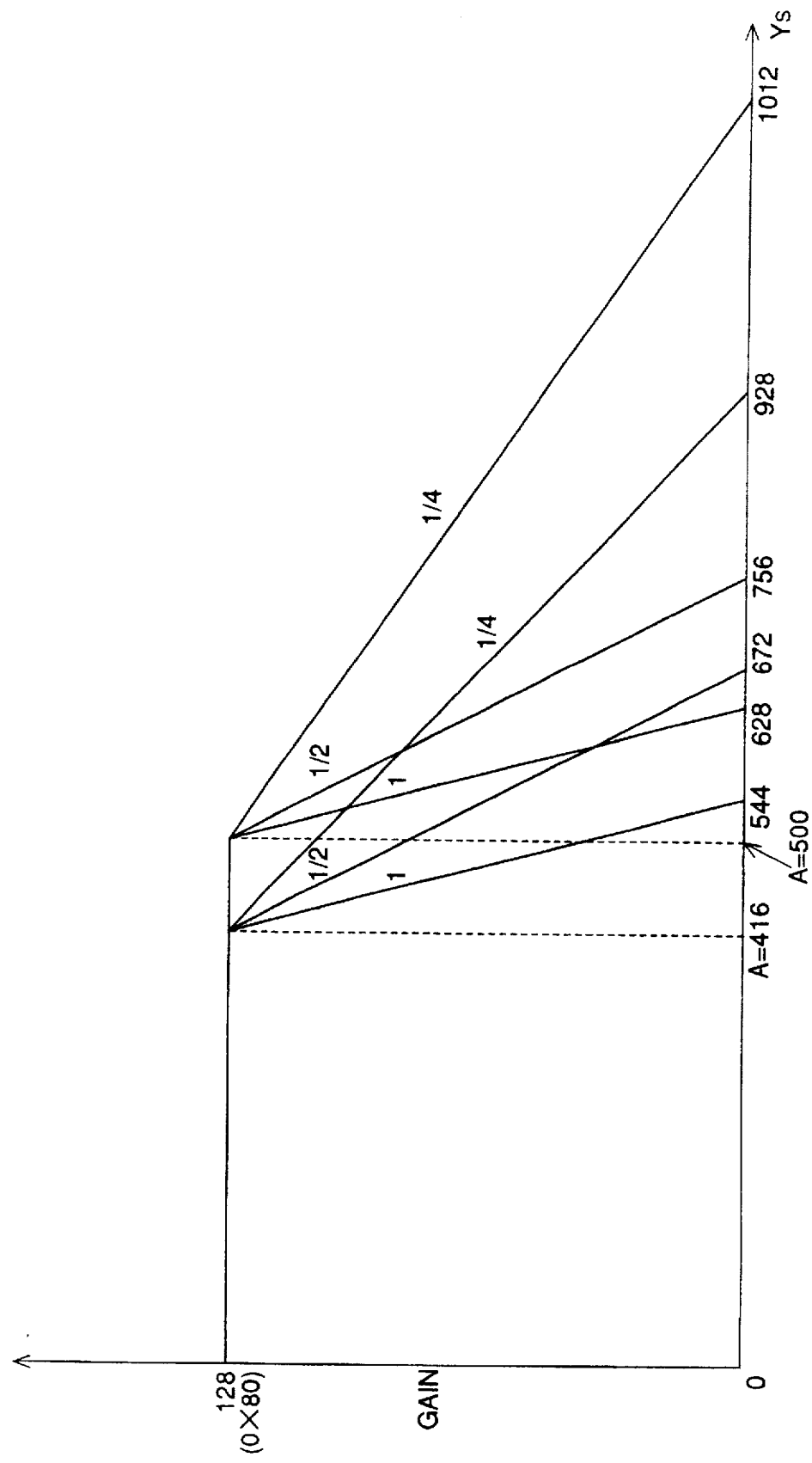
FIG. 5 is a graph showing the color suppression characteristics with respect to luminance.

FIG. 5 illustrates the gain of the multipliers 425 and 426 obtained when the value A is 416 and 500 and the coefficient is changed between 1, ½, and ¼.

Figure 6:
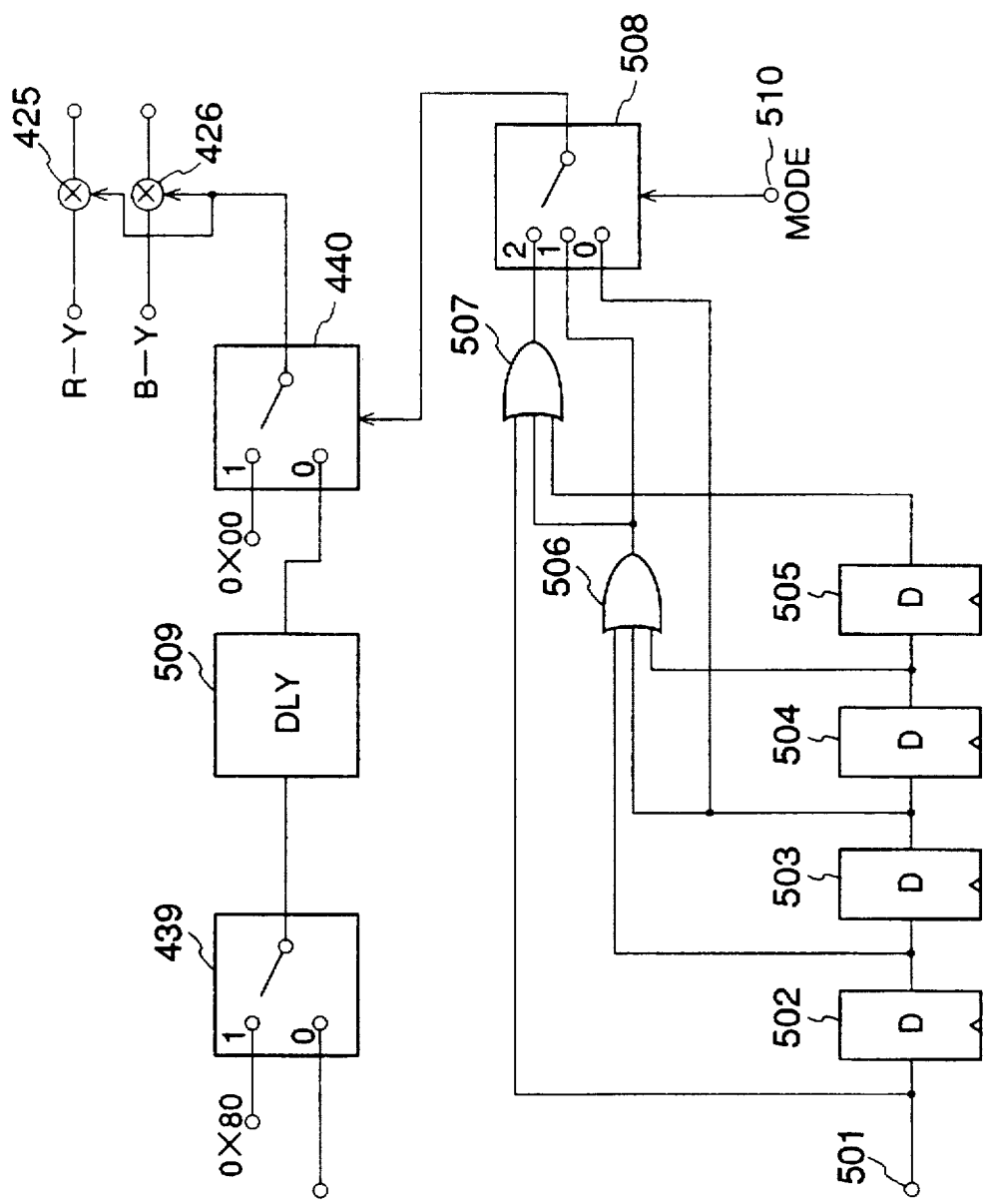
FIG. 6 is a block diagram showing the arrangement of an image pickup device according to the fourth embodiment of the present invention.

The fourth embodiment of the present invention will be described in detail below with reference to FIG. 6. FIG. 6 is a block diagram showing the arrangement of an image pickup device, which illustrates a circuit for processing an output signal from the selector 437 and thereby controlling the selector 440 in the third embodiment of the present invention.

Referring to FIG. 6, a delay line 509 is provided to match processing times, and a terminal 501 is for receiving an output signal from the selector 437 shown in FIG. 4.

This circuit also includes D-flip-flip circuits 502, 503, 504, and 505, 3-input OR circuits 506 and 507, a selector 508, the delay line 509, and an input terminal 510 for applying a mode signal for controlling the selector 508.

The operation of the circuit shown in FIG. 6 will be described. First, an output from the selector 437 shown in FIG. 4 is applied to the input terminal 501. This output from the selector 437 is a signal indicating that a gain for color suppression is 0. This signal output is sequentially supplied to the D-flip-flop circuits 502, 503, 504, and 505 in units of clocks.

Outputs from the D-flip-flops 502, 503, and 504 are applied to the OR circuit 506. An output from the OR circuit 506, an output from the D-flip-flop circuit 505, and the signal at the input terminal 501 are applied to the OR circuit 507.

The outputs from the D-flip-flop circuit 503 and the OR circuit 506 and an output from the OR circuit 507 are applied to the selector 508 and can be selected by the MODE signal 510.

Assume that only one point is found to have a high luminance and so the gain for color suppression must be set to 0. An operation in this case will be described below with reference to a timing chart shown in FIG. 7.

Figure 7:
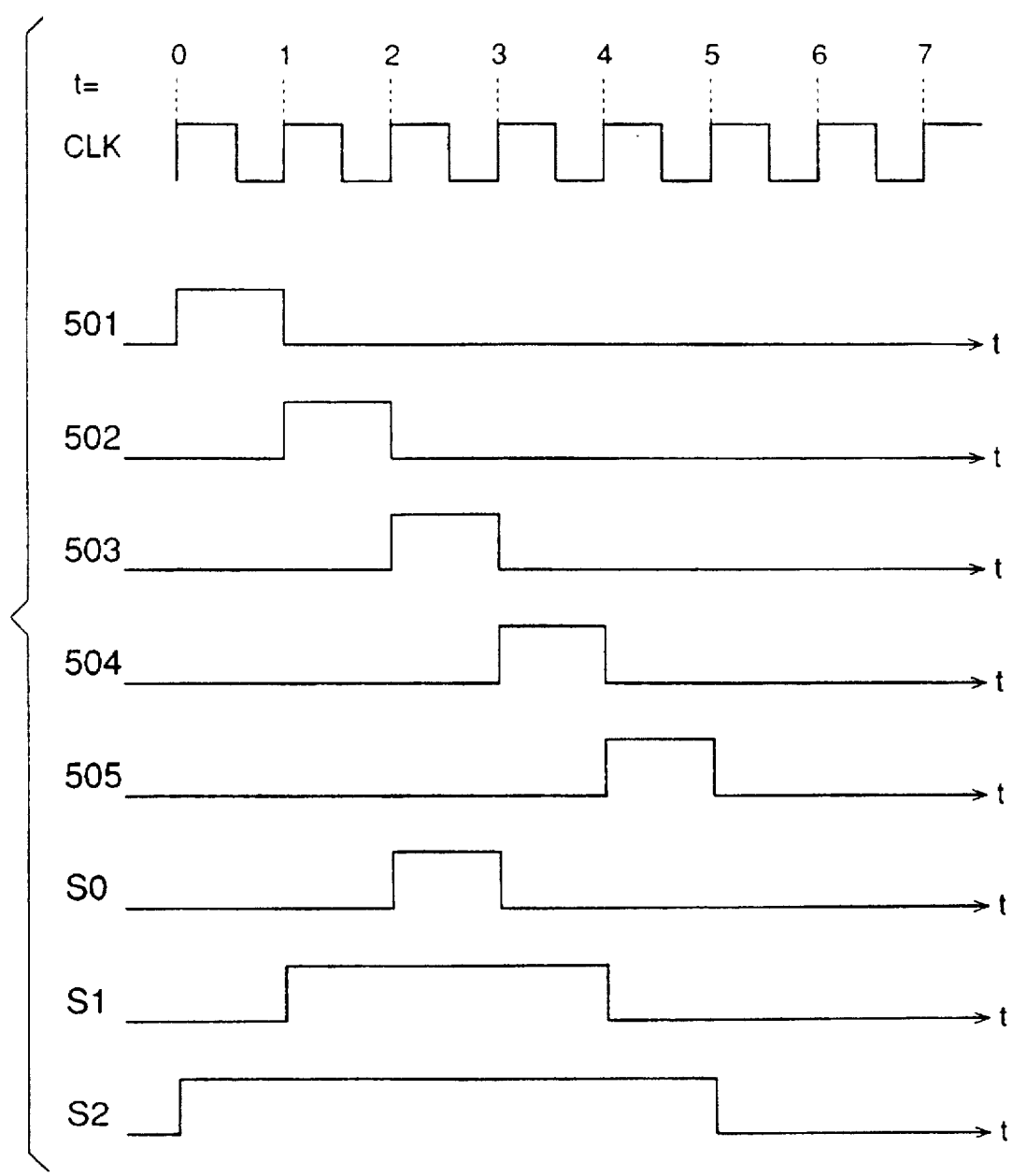
FIG. 7 is a timing chart showing operation timings of the fourth embodiment.

FIG. 7 illustrates the states of input flags and input signals to the selector 508 when time t=0 to 7. A flag corresponding to one time interval clock which is the same as that of the input terminal 501 is applied to the terminal 0 of the selector 508, a flag corresponding to three clocks is applied to its terminal 1, and a flag corresponding to five clocks is applied to its terminal 2. Consequently, a flag with an extended width can be output from the selector 508, making it possible to suppress even colors before and after one high-luminance portion.

In a conventional single-plate camera using a solid-state image sensor such as a CCD, MTF from medium to high frequencies is decreased by the aperture effect of an optical system or of the CCD. To correct a decrease in resolution of an image caused by the decrease in the MTF, edge emphasis for electrically emphasizing the medium and high frequencies of a luminance signal or correction called aperture correction is performed.

In this edge emphasis, scan is performed such that a high-frequency component as an edge component of an image is extracted from an original picture signal by using a high-pass filter and then added to the original picture signal. In this case, since the high-frequency component of the picture signal contains a large amount of a noise component, an S/N ratio may be decreased if the high-frequency component is added directly to the picture signal.

For this reason, an operation called base clip (BC) is conventionally performed in which a portion with a low amplitude level of a high-frequency component is not added but only a portion with a high amplitude level is added, thereby preventing reduction in S/N ratio.

In the above conventional example, however, a base clip width for the edge correction is fixed. In addition, a high-frequency component with a certain amplitude level or higher is added to an original luminance signal regardless of the S/N ratio of an image. Therefore, the magnitude of a correction signal is fixed although both high- and low-S/N portions are present in one image. In the above conventional example, therefore, the S/N ratio is sometimes decreased when the correction is performed.

Figure 8:
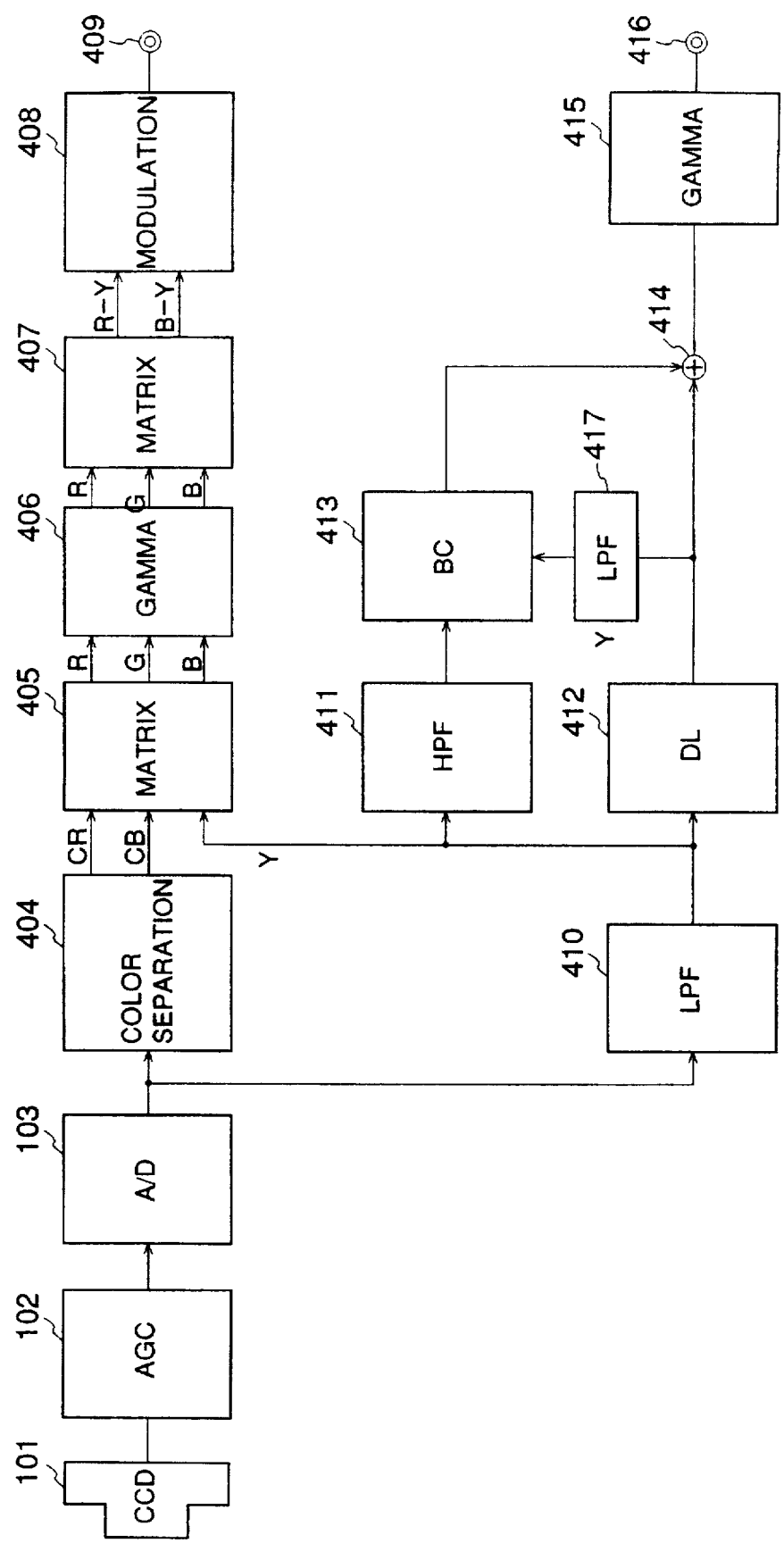
FIG. 8 is a block diagram showing the arrangement of an image pickup device according to the fifth embodiment of the present invention.

FIG. 8 is a block diagram showing the arrangement of an image pickup device according to the fifth embodiment of the present invention, which eliminates the above conventional drawback.

Referring to FIG. 8, this image pickup device includes a solid-state image sensor 101, such as a CCD, which has a complementary color filter, a CDS/AGC camera 102 for removing reset noise of the CCD to adjust a level in accordance with brightness, and an A/D converter 103 for converting a signal from the image sensor into a digital signal in units of pixels.

A color separation circuit 404 extracts color signal components from the signal from the image sensor. A matrix circuit 405 converts the color signal components into R, G, and B primary color signals. A gamma circuit 406 corrects the gamma characteristics of a monitor. A matrix circuit 407 converts the primary color signals into color difference components, such as R-Y and B-Y. A modulation circuit 408 multiplexes and modulates the color difference signals into a chroma signal. An output terminal 409 outputs the chroma signal.

A low-pass filter 410 suppresses a color carrier component of the signal from the image sensor to form a luminance signal component. A high-pass filter 411 extracts an edge component from the luminance signal. A base clip circuit 413 extracts only a component with a large amplitude from the edge component. A delay circuit 412 corrects a delay amount of the high-pass filter 411. An adder 414 adds the edge component to the luminance signal component. The image pickup device also includes a gamma correction circuit 415 and an output terminal 416 for outputting a luminance signal.

The operation of the image pickup device shown in FIG. 8 will be described below. Reset noise of an output image signal from the image sensor 101 is removed by the CDS/AGC circuit 102. The resultant signal with an appropriate level is applied to the A/D converter 103 and converted into a digital signal.

Note that the image sensor 101 is a color filter of a complementary color arrangement, from which a luminance signal component (Y signal) and color signal components are extracted while they are frequency-multiplexed to each other. $C_R$ and $C_B$ components are extracted from the color signal components by the color separation circuit 404 and converted together with a luminance signal Y into R, G, and B primary color signals by the matrix circuit 405.

These R, G, and B signals are applied to the gamma circuit 406, and the $\gamma$ characteristics of a monitor are corrected by the gamma circuit 406. The R, G, and B signals are then applied to the matrix circuit 407 and converted into R-Y and B-Y color difference signals. Thereafter, these color difference signals are quadrature-modulated into a chroma signal by the modulator 408 and output from the output terminal 409.

A luminance signal system according to this embodiment will be described. An output from the A/D converter 103 is applied to the low-pass filter 410. The low-pass filter 410 suppresses the frequency-multiplexed color signal component and thereby outputs only the luminance signal component.

Since MTF of the luminance signal is normally decreased at high frequencies by the aperture characteristics of the lens 101 or the CCD 102, the luminance signal is applied to the high-pass filter 411 for extracting its high-frequency component.

An output from the high-pass filter 411 is applied to the base clip circuit 413. This base clip circuit 413 is also applied with a Y signal component and can vary a region in which a portion with a small amplitude is suppressed in accordance with the magnitude of the Y signal. That is, the base clip circuit 413 is so controlled as to increase the suppression region in a portion in which the Y signal is small, and decrease the suppression region in a portion in which the Y signal is large.

The above edge component is applied to the adder 414 and added to the luminance signal component by the adder 414. The resultant signal is supplied to the gamma circuit 415. The signal is subjected to gamma correction performed by the gamma circuit 415 and output from the output terminal 416.

The operation of the base clip circuit 413 will be described below with reference to graphs shown in FIGS. 9A and 9B.

Figure 9A:
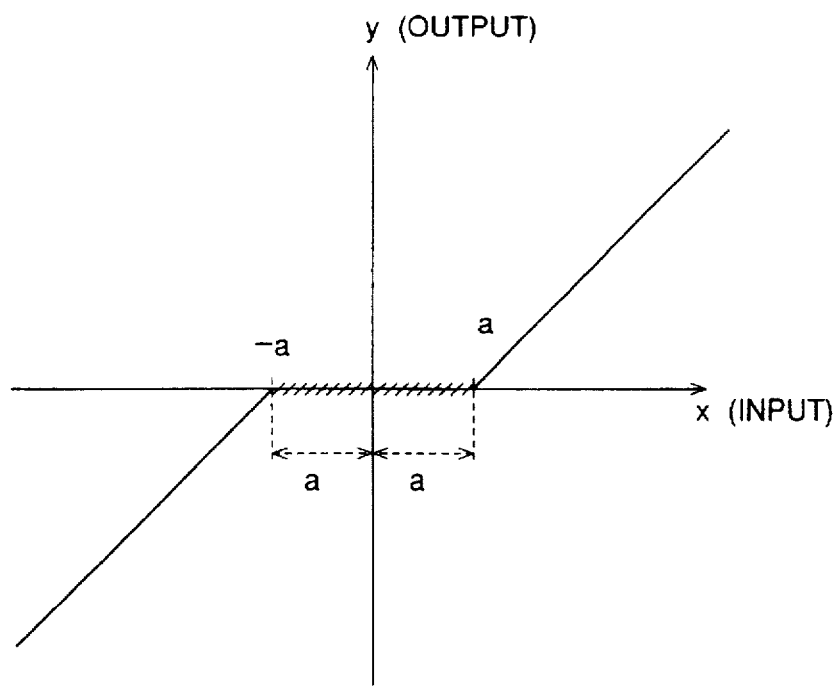
FIGS. 9A and 9B are graphs showing the characteristics of a base clip circuit according to the fifth embodiment.

FIG. 9A illustrates the characteristics of base clip, in which the x axis represents a signal input level from the high-pass filter 411, and the y axis represents an output level from the base clip circuit 413.

In FIG. 9A, a hatched portion between a point $\underline{a}$ and a point $-a$ on the x axis indicates a region in which an input signal is to be suppressed. As is apparent from FIG. 9A, when an input signal level is equal to or lower than the point $-a$ or equal to or higher than the point $\underline{a}$, a signal with a magnitude proportional to an input signal is output.

Figure 9B:
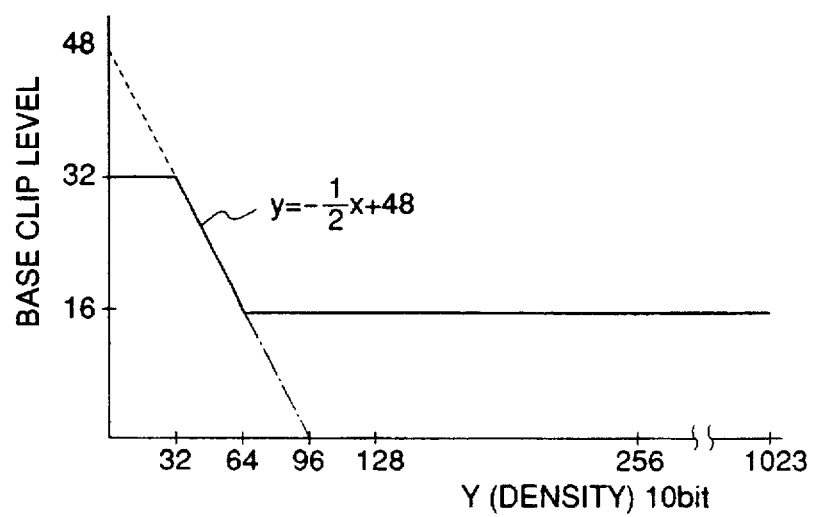

FIG. 9B shows the points $\underline{a}$ and $-a$ on the x axis described above, in which a 10-bit luminance signal is plotted along the abscissa that is varied by characteristics, and a base clip level $\underline{a}$ is plotted along the ordinate. When the luminance signal is small, i.e., in a dark portion, the base clip level is increased; when the luminance signal is large, i.e., in a bright portion, the base clip level is decreased.

Figure 10:
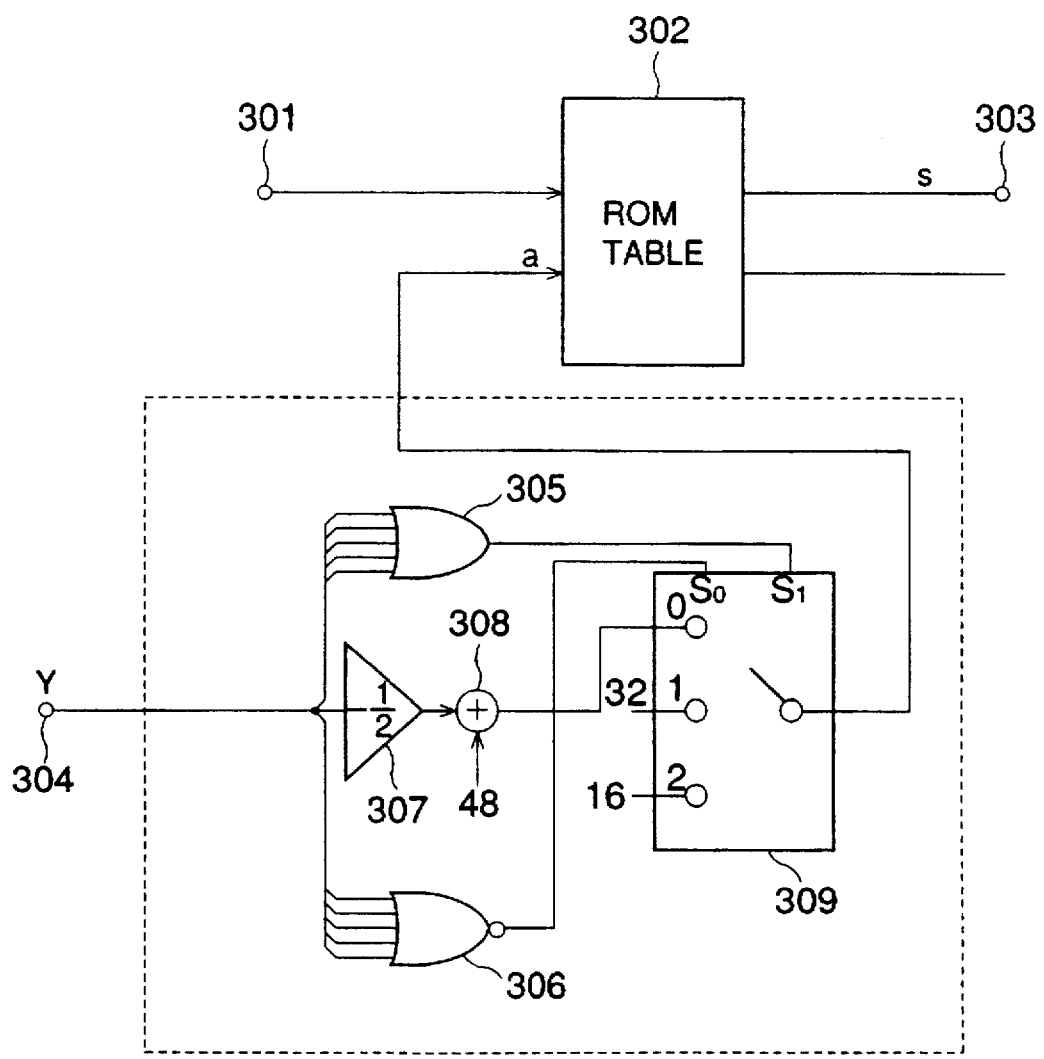
FIG. 10 is a block diagram showing the arrangement of a base clip circuit of the device shown in FIG. 8.

The configuration of the base clip circuit 413 will be described with reference to FIG. 10. Referring to FIG. 10, this circuit includes an input terminal 301 for receiving a signal from the high-pass filter 411, a ROM 302, and an output terminal 303. The circuit also includes an input terminal 304 for a Y signal, and an OR circuit 305 for ORing five upper bits of the ten bits of the Y signal.

Other components of the circuit are a NOR circuit 306 for NORing six upper bits of the ten bits of the Y signal, a $-\frac{1}{2}$ coefficient unit 307, an adder 308, and a selector 309. A signal from the high-pass filter 411 is applied from the input terminal 301 to the ROM 302.

A luminance signal, on the other hand, is applied as a 10-bit signal from the input terminal 304, and its five upper bits are applied to the OR circuit 305 to detect a signal with a level of 64 or more.

Six upper bits are applied to the NOR circuit 306 to detect a signal with a level of 32 or less. The $-\frac{1}{2}$ coefficient unit 307 and the adder 308 together generate a function of $y=-\frac{1}{2}x+48$, thereby generating a value of 16 or 32 in accordance with the input Y signal as listed in Table 1 below.

TABLE 1

| S1 | S0 | Y | Output |
|---|---|---|---|
| 0 | 0 | 32 < Y < 64 | $-1/2x + 48$ |
| 0 | 1 | Y < 32 | 32 |
| 1 | 0 | Y > 64 | 16 |
| 1 | 1 | None | |

The characteristics shown in FIG. 9A are written in the ROM table 302 for generating the base clip level a with respect to the Y signal illustrated in FIG. 9B. By controlling the characteristics by using a signal supplied from the selector 309, it is possible to realize a circuit whose base clip width can be varied by the Y signal level.

Figure 11:
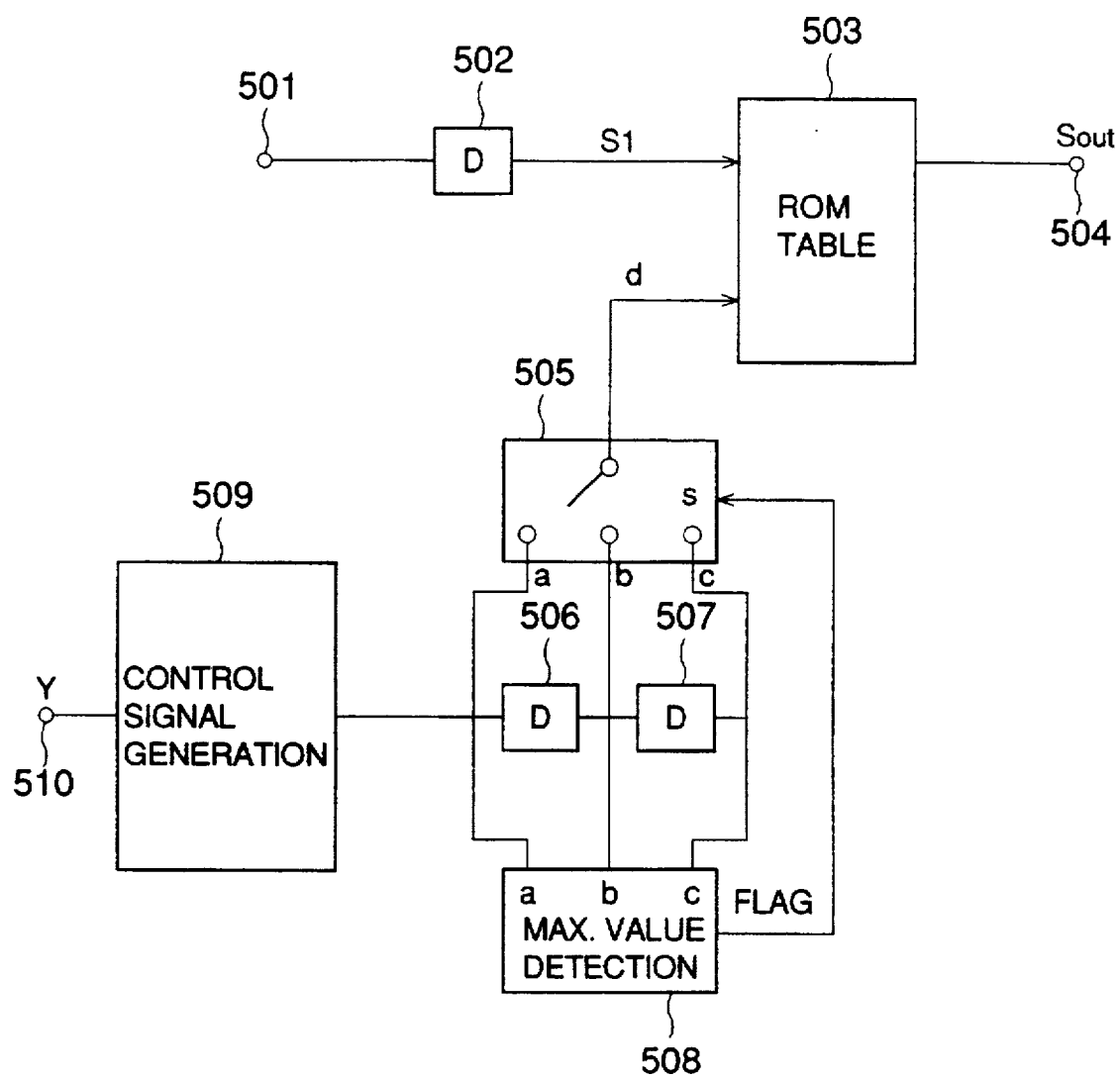
FIG. 11 is a block diagram showing the arrangement of an image pickup device according to the sixth embodiment of the present invention.

The sixth embodiment of the present invention will be described below with reference to FIG. 11. Referring to FIG. 11, this embodiment includes an input terminal 501 for applying an edge component from the HPF 411 shown in FIG. 8, a D-flip-flop circuit 502, a ROM table 503, an output terminal 504, a selector 505, D-flip-flop circuits 506 and 507, a maximum value detector 508, a control signal generation circuit 509 surrounded by dotted lines in FIG. 3, and an input terminal 510 for receiving a Y signal from the LPF 417 shown in FIG. 8.

The operation of the device shown in FIG. 11 will be described below. A high-frequency component of an image which is extracted by the high-pass filter 411 is applied to the input terminal 501.

A luminance signal, on the other hand, is applied to the input terminal 510 and supplied to the control signal generation circuit 509. The control signal generation circuit 509 generates a control signal corresponding to the level of the luminance signal and applies this control signal to the ROM table 503. The ROM table 503 generates a signal for controlling a gain.

More specifically, the control signal generated by the control signal generation circuit 509 is supplied to the D-flip-flop circuits 506 and 507. Outputs from the D-flip-flop circuits 506 and 507 at this point are three signals which are temporally shifted by one clock each. These signals are supplied to input terminals $\underline{a}$, b, and c of the maximum value detector 508 and input terminals $\underline{a}$, b, and c of the selector 505.

The maximum value detector 508 detects the maximum value of the three signals applied to the input terminals $\underline{a}$, b, and c, and generates a flag. The selector 505 selectively outputs this maximum value and controls the ROM table 503 by this output signal, thereby outputting an edge signal $S_{out}$ to the output terminal 504.

Figure 12A:
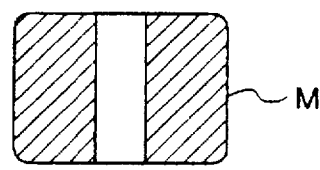
FIGS. 12A and 12B are views for explaining the operation of the sixth embodiment.

The operation will be described in more detail below with reference to FIGS. 12A and 12B. In the following description, it is assumed that a white band-like image is displayed on a monitor M.

Figure 12B:
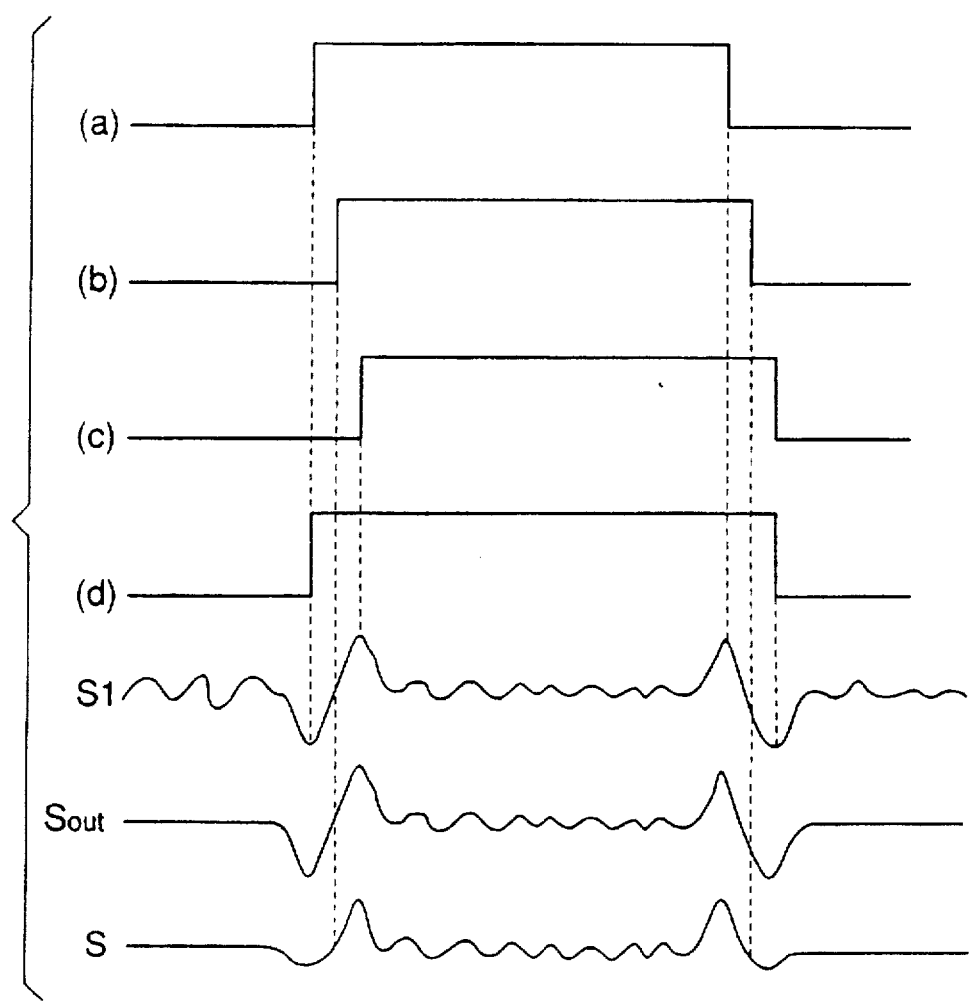
Figure 13:
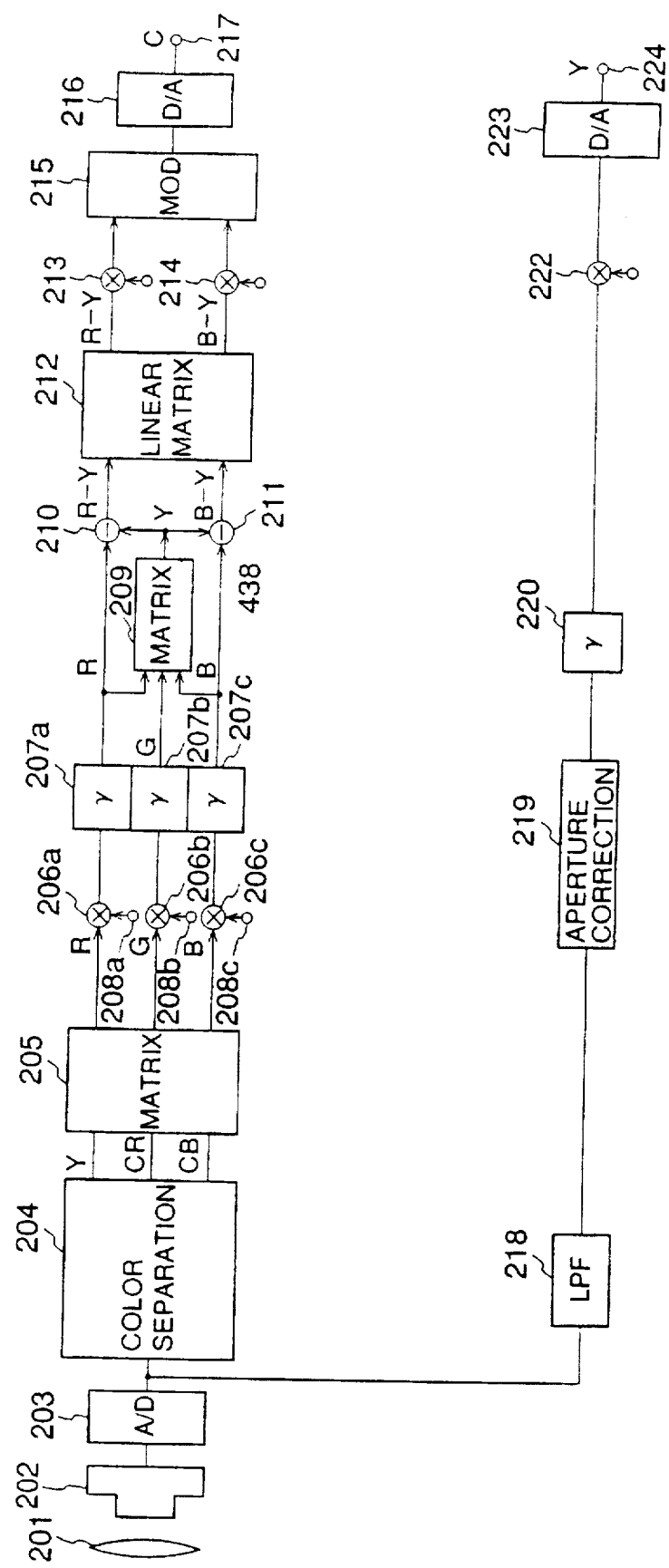
FIG. 13 is a block diagram showing the arrangement of an image pickup device according to the seventh embodiment of the present invention.
Figures 14A, 14B:
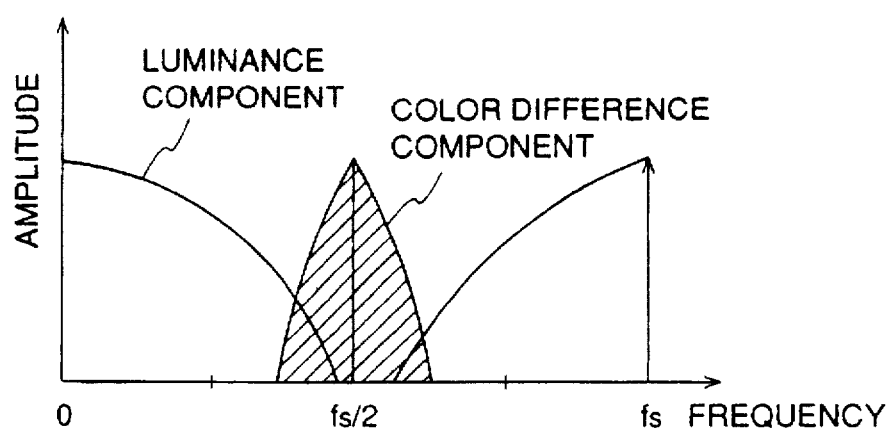
FIGS. 14A and 14B are views for explaining an example of a color filter of a CCD and spectrums of luminance and color.

Referring to FIG. 12B, (a), (b), and (c) represent control signals to be applied to the selector 505, and (d) represents an output signal from the selector 505. S1 represents a high-frequency component of an image. $S_{out}$ represents an edge component of an output image from the output terminal 504, and S represents an output signal from the output terminal 303 of the embodiment shown in FIG. 10.

When a white band-like image is displayed on the monitor M, an output from the control signal generation circuit 509 is the signal as indicated by (a), and outputs from the DDFs 506 and 507 are the signals delayed by one and two clocks as indicated by (b) and (c), respectively. In order to extract the maximum value of these three signals at any instant, an output from the selector becomes the temporally widened signal as indicated by (d).

The high-frequency component of an image takes the waveform as indicated by S1, appearing as a response that is symmetrical between black and white sides in a noise component and an edge portion of the image. The clip amount of the ROM table 503 is increased in a portion where the luminance level of an image is low. Therefore, for the control signal (b) of the above fifth embodiment, only the edge portion on the black side is clipped to form an asymmetrical waveform as indicated by S in FIG. 12B. For the control signal (d) of this embodiment, however, the edge on the black side is not clipped, resulting in a linear waveform response.

According to each of the above embodiments as described above, the base clip circuit is provided in the device for correcting a luminance signal by using color difference signals, and a correction signal is generated by base-clipping at least one of the color difference signals. This prevents a decrease in S/N ratio of the luminance signal in a light-color portion, making it possible to perform accurate correction. In addition, a combination of the subtracter and the limiter realizes a base clip effect and also makes correction control using a hue possible. By using the adder and the limiter of a positive side as the limiter of a negative side, a hue that is opposite to the above hue can also be controlled. Furthermore, it is also possible to optimize a correction amount by controlling the multiplier by using color temperature information of an object to be photographed, which is obtained from auto white balance information.

In the circuit for suppressing a color false signal in a high-luminance portion, it is possible to vary a suppression start point and a suppression gain. Therefore, color suppression can be carried out in accordance with the characteristics of a CCD, and this realizes excellent color suppression characteristics. In addition, good suppression characteristics can be obtained in accordance with photographing conditions under the control of a controller. Furthermore, it is possible to prevent spread or blur of a false signal by increasing the width of a suppression signal in a high-luminance portion.

Also, edge correction can be performed by changing the base clip width of an edge component correction signal in accordance with the level of a luminance signal without emphasizing only a noise component in a dark portion of an image. This prevents reduction in S/N ratio caused by the edge correction and thereby makes reproduction of high-quality images possible.

Still another embodiment of the present invention will be described below. In general color image pickup devices, a luminance signal and color signals are processed independently of each other. Therefore, especially when an object with a high saturation is imaged, the ratios of a luminance signal to color signals change, and this undesirably degrades color reproducibility.

This embodiment has been made in consideration of the above situation and has as its object to provide an image pickup device capable of realizing a high color reproducibility.

To achieve the above object, this embodiment provides an image pickup device comprising a color signal generating means for separately generating a plurality of color signals from an image signal obtained by image pickup means, a correction signal generating means for generating a correction signal on the basis of a luminance signal obtained from the image signal, and a correcting means for correcting the color signals by using the correction signal.

According to the embodiment with the above arrangement, the band of a color signal with a relatively narrow band can be widened.

This embodiment therefore can improve the color reproducibility of an image pickup device of the above sort.

The details of the embodiment will be described below with reference to FIGS. 18 to 23.

Figure 18:
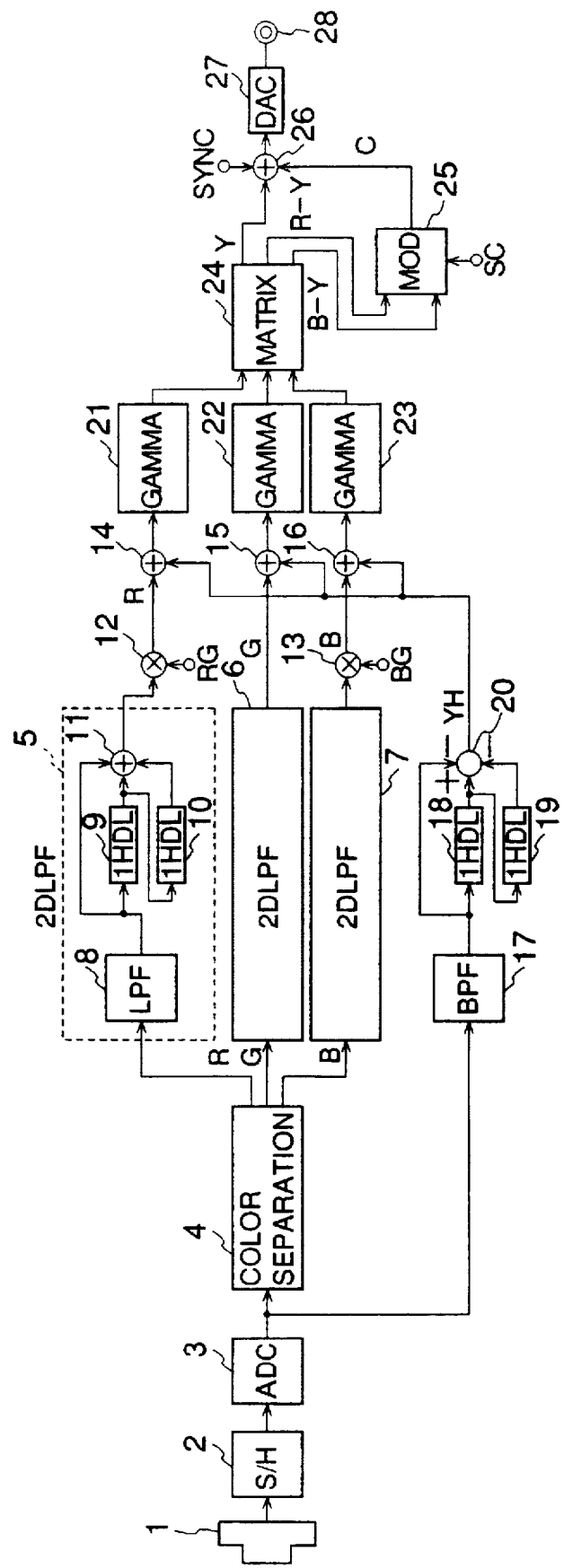
FIG. 18 is a block diagram showing the electrical arrangement of still another embodiment of the image pickup device according to the present invention.

FIG. 18 is a block diagram showing an image pickup device according to this embodiment. Referring to FIG. 18, this image pickup device includes a CCD 1 with a color mosaic filter, a sample-and-hold circuit (S/H) 2 for sampling-and-holding an output from the CCD 1, an A/D converter (ADC) 3 for converting an output from the sample-and-hold circuit into a digital signal, a color separation circuit 4 for separately extracting R, G, and B primary color signals from the digital image output, and two-dimensional low-pass filters (2DLPFs) 5, 6, and 7 for limiting the bands of the respective color signals in both the vertical and horizontal directions. Each two-dimensional low-pass filter is constituted by a low-pass filter 8, 1H delay lines 9 and 10 for delaying an image signal by one horizontal period, and an adder 11.

The image pickup device also includes multipliers 12 and 13, adders 14, 15, and 16, a band-pass filter 17, 1H delay lines 18 and 19, and a subtracter 20. The 1H delay lines and the subtracter 20 constitute a vertical high-pass filter.

Other components are gamma circuits 21, 22, and 23, a matrix circuit 24 for generating a luminance signal Y and color different signals R-Y and B-Y from γ-corrected primary color signals, a modulator 25 for modulating the color difference signals by using a predetermined color subcarrier (SC), an adder 26 for adding the luminance signal, the color difference signals, and a sync signal, a D/A converter (DAC) 27 for converting a digital signal into an analog signal, and an output terminal 28.

In the image pickup device with the above arrangement, an image of an object to be photographed is formed on the light-receiving surface of the CCD 1 via an optical system (not shown) consisting of, e.g., a lens, a diaphragm, and an optical filter. The image is photoelectrically converted into a discrete image signal, and this image signal is converted into a continuous signal by the sample-and-hold circuit 2.

The image signal is further converted into a digital signal by the A/D converter 3.

The consequent digital image signal is separated into R, G, and B primary color signals by the color separation circuit 4 and supplied to the 2DLPFs.

In each 2DLPF, the band of the signal is first limited in the horizontal direction by the LPF 8 and then limited in the vertical direction by the vertical LPF constituted by the 1HDLs 9 and 10 and the adder 11.

Of these filtered primary color signals, the R and B signals are multiplied by predetermined coefficients RG and BG by the multipliers 12 and 13, respectively, to control white balance, thereby controlling the gains of these signals.

The gain-controlled R and B signals and the R signal are added with a high-frequency luminance signal YH (to be described later) by the adders 14, 15, and 16, respectively, and subjected to gamma correction performed by the gamma circuits 21, 22, and 23, respectively.

Thereafter, the matrix circuit 24 forms the luminance signal Y and the color difference signals R-Y and B-Y. The color difference signals are modulated by SC by the modulator 25 and added to the luminance signal and the sync signal by the adder 26.

The resulting addition output is converted into an analog signal by the D/A converter 27 and output as a composite television signal from the output terminal 28. This composite TV signal is supplied to various equipment such as a TV receiver or a VCR (not shown).

On the other hand, a horizontal high-frequency component except for a color carrier is extracted from an output from the A/D converter 3 by the BPF 17. Thereafter, a vertical high-frequency component is extracted from the resulting signal by the vertical HPF constituted by the 1HDLs 18 and 19. The signal is then supplied as the high-frequency luminance signal YH to the adders 14, 15, and 16 and added to the primary color signals R, G, and B, respectively.

Figure 19A:
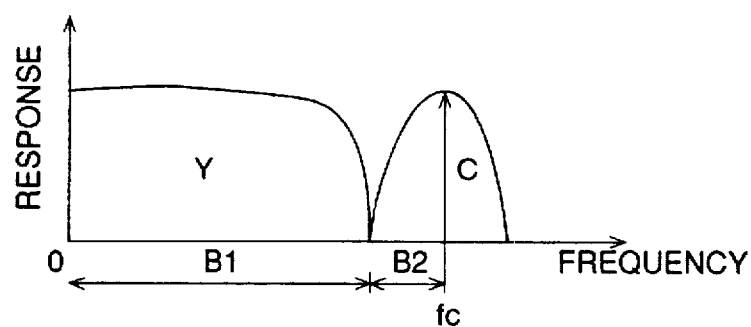
FIGS. 19A, 19B, and 19C are graphs and a view showing the frequency characteristics of the embodiment shown in FIG. 18.
Figure 19B:
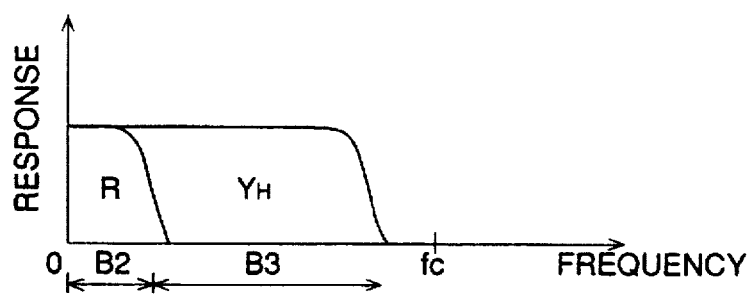
Figure 19C:
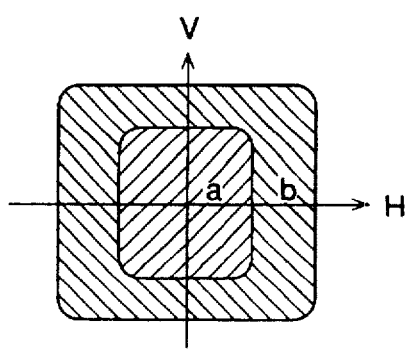

According to the image pickup device with the above arrangement, it is possible to obtain wide-band color signals as illustrated in FIGS. 19A to 19C and thereby improve color reproducibility.

That is, FIG. 19A shows the frequency distribution of the output from the CCD 1. As shown in FIG. 19A, a color carrier caused by color repetition of a color filter takes place in fc.

In FIG. 19A, the bands of the luminance signal Y and the color signal C are limited to B1 and B2, respectively, by the optical filter.

Upon color separation, as shown in FIG. 19B, the R signal, for example, is given a band of 0 to B2. By adding such a primary color signal to YH whose band is limited by the BPF 17, a primary color signal having a band of B2+B3 as a whole can be obtained.

FIG. 19C two-dimensionally illustrates this state. Referring to FIG. 19C, a band a is formed by the color signal, and a band b is formed by the high-frequency luminance signal YH. Therefore, a band (a+b) of the color signal can be a very wide band as a whole. This makes it possible to improve color reproducibility.

An image pickup device according to still another embodiment of the present invention will be described below.

Figure 20:
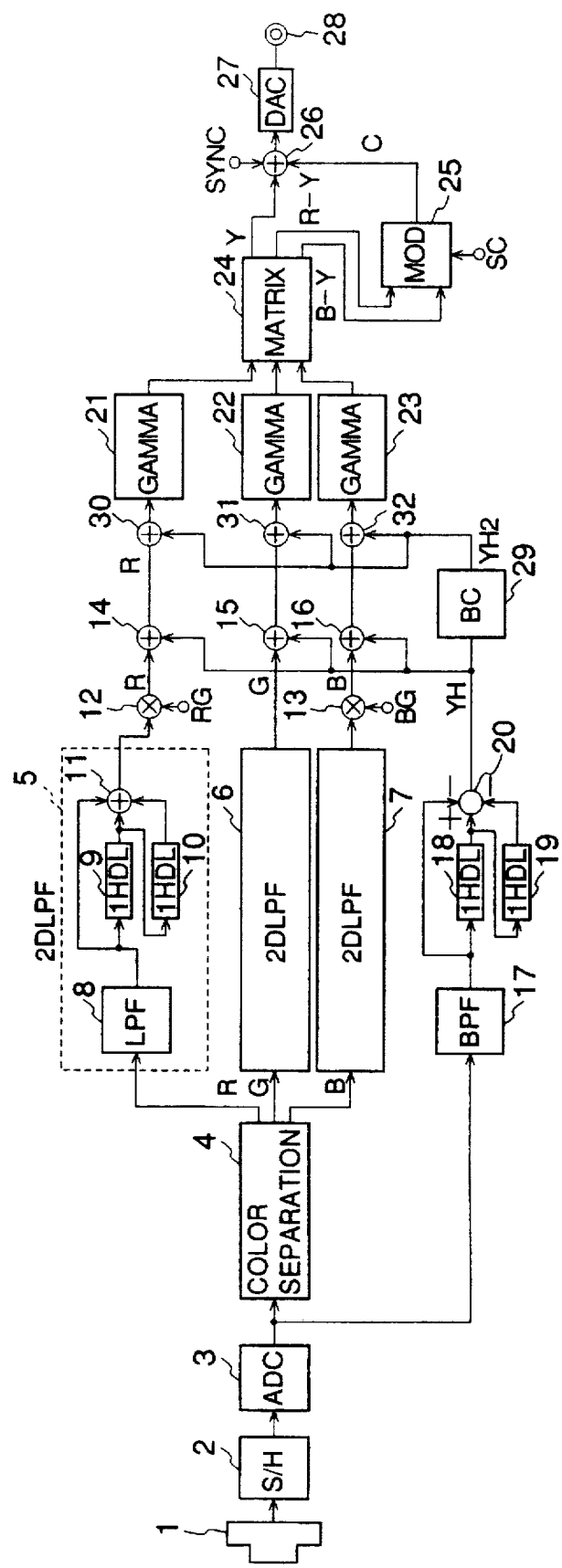
FIG. 20 is a block diagram showing the electrical arrangement of still another embodiment of the image pickup device according to the present invention.

FIG. 20 is a block diagram showing the arrangement of an image pickup device according to this embodiment, in which the same reference numerals as in the embodiment shown in FIG. 18 denote the same parts.

Referring to FIG. 20, this image pickup device includes a base clip circuit 29 for suppressing a small-amplitude portion of an input signal, and adders 30, 31, and 32.

Like in the above embodiment, a high-frequency luminance signal YH formed by a BPF 17 and a vertical high-pass filter is added to color signals by adders 14, 15, and 16. In addition, the base clip circuit 29 forms a high-frequency luminance signal YH2, in which a small-amplitude portion is suppressed, from the high-frequency luminance signal YH. This high-frequency luminance signal YH2 is supplied to the adders 30, 31, and 32 and added to the color signals.

Figure 21:
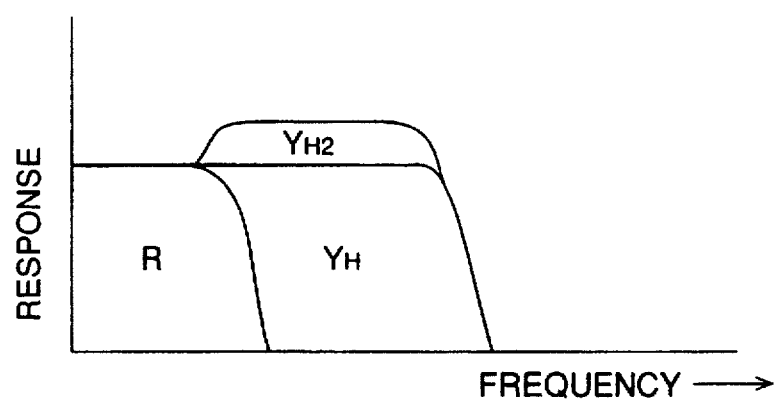
FIG. 21 is a graph showing the frequency characteristics of the embodiment shown in FIG. 20.

According to this embodiment with the above arrangement, therefore, it is possible to obtain a color signal with a high S/N ratio and a wide band, as shown in FIG. 21.

More specifically, in this embodiment, the adder 30 adds YH2 formed by the base clip circuit 29 to YH formed by the adders described above, resulting in a signal whose high frequencies are emphasized. In addition, the S/N ratio of this YH2 is not decreased because its very small amplitude is suppressed.

An image pickup device according to still another embodiment of the present invention will be described below.

Figure 22:
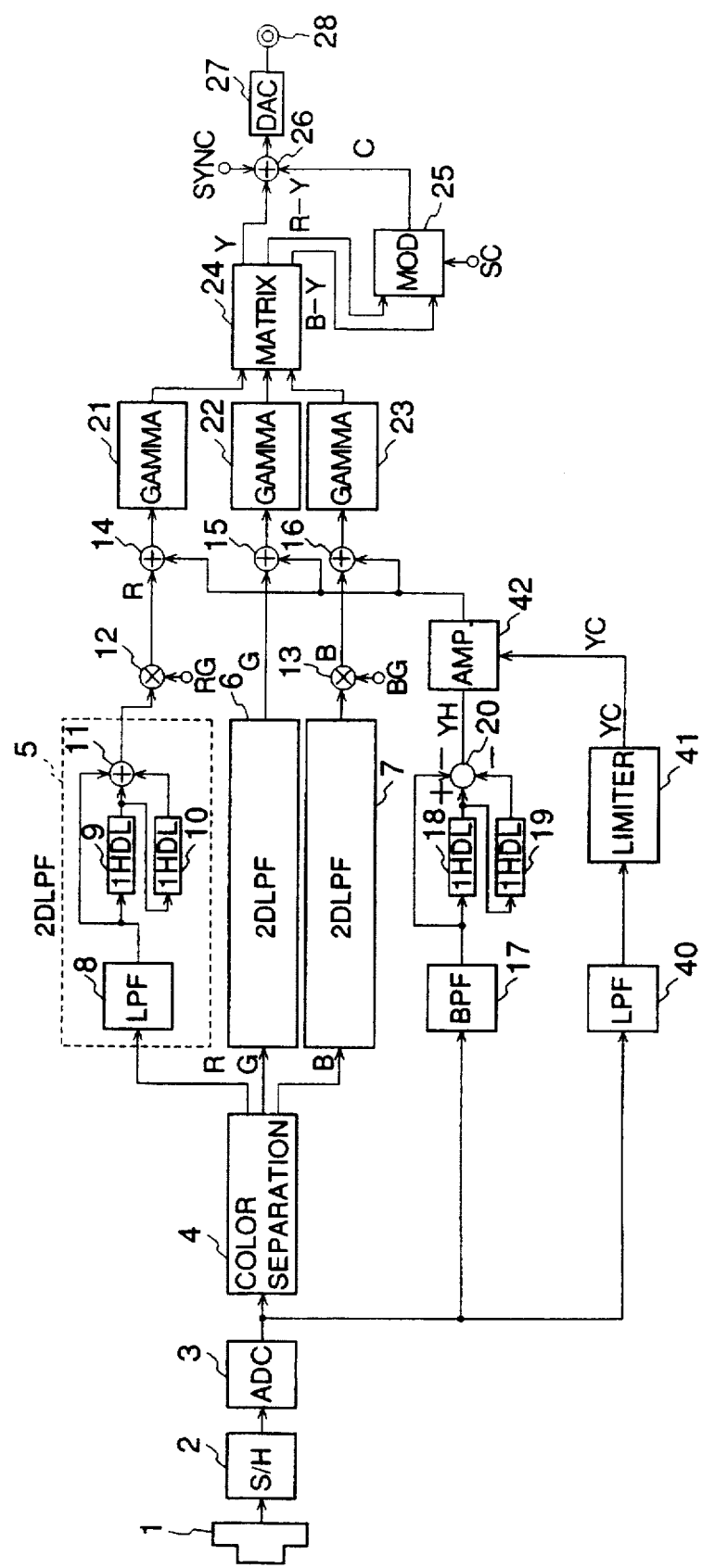
FIG. 22 is a block diagram showing the electrical arrangement of still another embodiment of the image pickup device according to the present invention.

FIG. 22 is a block diagram showing the arrangement of an image pickup device of this embodiment, in which the same reference numerals as in the embodiment shown in FIG. 18 denote the same parts.

Referring to FIG. 22, this image pickup device includes a low-pass filter 40 for forming a low-frequency luminance signal, a limiter 41, and a variable-gain amplifier 42.

In this embodiment, an output signal from an A/D converter 3 is supplied to a color separation circuit 4 and a BPF 17, like in the embodiment shown in FIG. 18, and is also supplied to the LPF 40.

This LPF 40 has frequency transmission characteristics similar to those of the LPF 8 described above. The limiter 41 limits a high-level portion of an output low-frequency luminance signal from the LPF 40, forming a control signal YC.

This control signal YC is supplied to the control terminal of the variable-gain amplifier 42 which is also applied with a high-frequency luminance signal YH formed in the same manner as in the embodiment shown in FIG. 18. Consequently, the variable-gain amplifier 42 controls a gain for the high-frequency luminance signal YH.

Like in the above embodiment, an output signal from this variable-gain amplifier 42 is supplied to adders 14, 15, and 16 and added to color signals R, G, and B, respectively.

Figure 23:
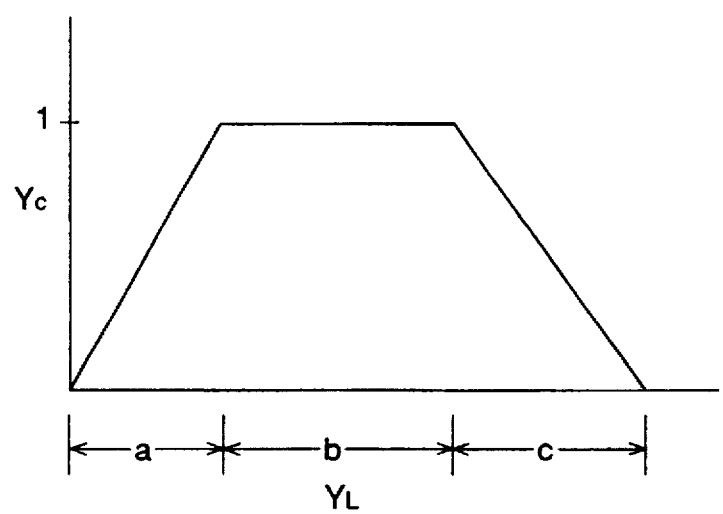
FIG. 23 is a graph showing the frequency characteristics of the embodiment shown in FIG. 22.

FIG. 23 shows the relationship between the control signal YC formed by the limiter 41 and a low-frequency luminance signal YL.

As can be seen from FIG. 23, almost no limitation is performed for a portion a in which the low-frequency luminance signal YL is small. When the low-frequency luminance signal YL becomes a predetermined value or larger (a portion b), the gain of the variable-gain amplifier 42 is decreased, and limitation is so performed as to decrease the control signal YC. When the low-frequency luminance signal YL further increases (a portion c), the control signal YC is suppressed. This makes it possible to prevent an increase in noise when an object to be photographed is dark and also prevent occurrence of luminance steps especially in a high-luminance portion.

As is apparent from the above description, according to each embodiment of the present invention, correction is performed for each primary color signal by using a correction signal based on a luminance signal. Therefore, the band of each color signal can be widened, and this makes it possible to obtain a color signal with a high color reproducibility.

In addition, in the above embodiments, each color signal which is given a wide band as described above is subjected to y correction, and then these color signals are used to form color difference signals and a luminance signal. Therefore, the luminance signal and the color difference signals can be obtained at an accurate RGB ratio. Consequently, gradation characteristics in a high-saturation portion can be improved.

As has been described above, each embodiment of the present invention can provide an image pickup device with a high color reproducibility.

What is claimed is:

1. An image pickup device comprising:
   means for generating a suppression control signal for suppressing two color difference signals by using luminance information; and setting means capable of freely setting a suppression start point and a suppression gain of the suppression control signal.

2. A device according to claim 1, wherein a control point of the suppression control signal is widened.

3. An image pickup device comprising:

delay means for delaying a digital signal, which is formed by converting a signal from an image pickup means, in a plurality of stages; and control means for selecting a maximum value from delayed outputs of said plurality of stages, and controlling an output level of a high-frequency component by using the maximum output value.

4. A device according to claim 3, further wherein image pickup means converts an optical image into an electrical signal and comprises an image sensor or an image pickup tube.

5. A device according to claim 4, further comprising A/D conversion means for converting the output of said image pickup means into a digital signal.

6. A device according to claim 3, wherein said control means includes a gate circuit for obtaining the maximum output value of the delayed outputs of said plurality of stages.

* * * * *

UNITED STATES PATENT AND TRADEMARK OFFICE
CERTIFICATE OF CORRECTION

PATENT NO. : 5,767,899

DATED : June 16, 1998

INVENTOR(S): TERUO HIEDA, ET AL.

Page 1 of 2

It is certified that error appears in the above-identified patent and that said Letters Patent is hereby corrected as shown below:

COLUMN 4
Line 31, "complimentary" should read --complementary--;
Line 60, "a or" should read --a or--;
Line 63, "the all" should read --all the--.

COLUMN 7
Line 14, "D-flip-flip" should read --D-flip-flop--.

COLUMN 10
Line 14, "a" should read --a--.

COLUMN 12
Line 31, "different" should read --difference--.

COLUMN 14
Line 35, "a in" should read --a in--;
Line 54, "y" should read --$\gamma$--.

UNITED STATES PATENT AND TRADEMARK OFFICE
CERTIFICATE OF CORRECTION

PATENT NO. : 5,767,899

DATED : June 16, 1998

INVENTOR(S): TERUO HIEDA, ET AL.

It is certified that error appears in the above-identified patent and that said Letters Patent is hereby corrected as shown below:

<u>COLUMN 16</u>
Line 1, "further wherein" should read --wherein said--.

Signed and Sealed this

Thirteenth Day of April, 1999

Attest:

Q. TODD DICKINSON

*Attesting Officer*  *Acting Commissioner of Patents and Trademarks*